(12) United States Patent
Ruiz

(10) Patent No.: US 7,370,747 B2
(45) Date of Patent: May 13, 2008

(54) PORTABLE ROLLER SUPPORT DEVICE

(76) Inventor: Chris Ruiz, P.O. Box 2364, Julian, CA (US) 92036

( * ) Notice: Subject to any disclaimer, the term of this patent is extended or adjusted under 35 U.S.C. 154(b) by 287 days.

(21) Appl. No.: 11/219,088

(22) Filed: Sep. 1, 2005

(65) Prior Publication Data

US 2007/0049475 A1    Mar. 1, 2007

(51) Int. Cl.
B65G 13/00 (2006.01)
(52) U.S. Cl. .............. 193/35 R; 269/289 MR; 144/287
(58) Field of Classification Search ............ 198/860.1, 198/861.1; 193/35 R, 37; 83/471; 144/287, 144/84, 253.3; 269/901, 904, 905
See application file for complete search history.

(56) References Cited

U.S. PATENT DOCUMENTS

| | | | | |
|---|---|---|---|---|
| 2,517,112 A | | 8/1950 | Jones | ............ 143/132 |
| 3,081,857 A | * | 3/1963 | Krueger | ............ 193/35 R |
| 3,572,485 A | * | 3/1971 | Hardin | ............ 193/35 R |
| 4,753,279 A | * | 6/1988 | Harris | ............ 144/287 |
| 4,852,623 A | * | 8/1989 | Rodrigues | ............ 144/287 |
| 5,064,156 A | | 11/1991 | Handler et al. | ............ 248/168 |
| 5,320,150 A | * | 6/1994 | Everts et al. | ............ 144/287 |
| 6,095,319 A | | 8/2000 | Noniewicz et al. | ......... 198/632 |
| D432,246 S | | 10/2000 | Pestone | ............ D25/67 |
| 6,179,116 B1 | | 1/2001 | Noniewicz et al. | ......... 198/632 |
| 6,575,213 B1 | * | 6/2003 | Houk | ............ 144/287 |
| 6,942,085 B1 | * | 9/2005 | Tatz | ............ 193/35 R |
| 7,066,224 B2 | * | 6/2006 | Gilmour | ............ 144/287 |

* cited by examiner

Primary Examiner—James R. Bidwell
(74) Attorney, Agent, or Firm—Steins & Associates, P.C.

(57) ABSTRACT

A Portable Roller Support Device is disclosed. The device provides rolling support for material in the process of being cut or otherwise manipulated. The support has a stable base and a series of height-adjustable legs with feet at their bottoms. The adjustable legs are also reversible such that the legs can perform an additional function of a threaded stud for attaching the support to a bench or table. Locking knobs are provided to enable the legs to be locked in a desired position once adjusted to that point.

19 Claims, 4 Drawing Sheets

PORTABLE ROLLER SUPPORT DEVICE

BACKGROUND OF THE INVENTION

1. Field of the Invention

This invention relates generally to tools and fixtures and, more specifically, to a portable roller support device.

2. Description of Related Art

Roller supports having adjustable height are widely available for use in workshop applications. These devices are used to allow the ends of long pieces of material to be supported while the user is working on the other end of the material (e.g. cutting the material with a chop saw). Roller supports include rollers to enable the user to slide the material longitudinally towards or away from him or herself, while still providing solid support for the material (i.e. in a horizontal direction).

The conventional roller supports typically further include at least some measure of height adjustability. The height adjustability is provided so that the roller support can be configured to work with varying table and/or tool heights. Many of these roller supports are further fitted with collapsible legs to allow the supports to be folded up and put away when not in use.

While the conventional roller supports are very useful for shop applications, they really are not very helpful for field applications. In the field, the user is many times working off of the ground and/or some other surface (e.g. a truck bed) that is not in the height range of the typical workbench or shop tool. In these situations, the user historically has been required to create a support structure, typically out of scrap material. These cobbled-together supports are rarely suitable, in part because they do not have the valuable rolling aspect to their support. Even though the conventional roller support stands to permit some height adjustment, they do not allow adjustment until the roller is a height corresponding to a chop saw resting on the ground.

What is needed, then, is a roller support that is portable and can be adjusted to the very low heights mandated for field applications.

SUMMARY OF THE INVENTION

In light of the aforementioned problems associated with the prior devices, it is an object of the present invention to provide a Portable Roller Support Device. The device should provide rolling support for material in the process of being cut or otherwise manipulated. The support should have a stable base and a series of height-adjustable legs with feet at their bottoms. The adjustable legs should also be reversible such that the legs can perform an additional function of a threaded stud for attaching the support to a bench or table. Locking knobs should be provided to enable the legs to be locked in a desired position once adjusted to that point.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Portable Roller Support Device.

Figure 1:
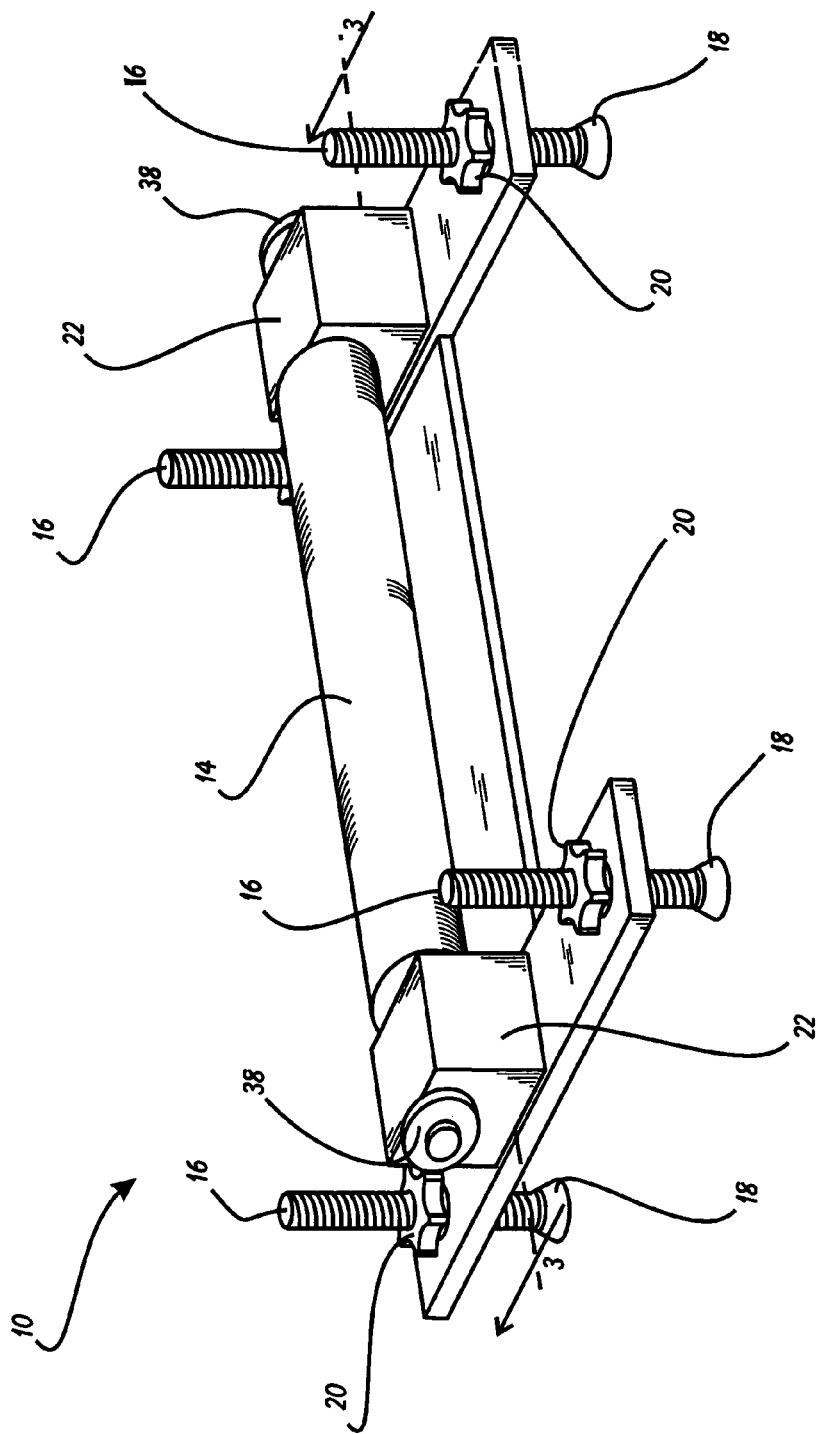
FIG. 1 is a perspective view of a preferred embodiment of the portable roller support device of the present invention.

The present invention can best be understood by initial consideration of FIG. 1. FIG. 1 is a perspective view of a preferred embodiment of the portable roller support device 10 of the present invention. The device 10 comprises a base 12 that has a roller 14 mounted to it. The base 12 has several threaded studs 16 threaded through it to serve as leveling legs for the base 12. Each threaded stud 16 has a foot 18 at one end, such as a conical shape made from rubberized material to inhibit the feet from slipping on the surface upon which the device 10 is resting. Each threaded stud 16 is held in its adjustment position by a locking knob 20 that is tightened against the base 12 to prevent that locking stud 16 from turning.

A pair of mounting blocks 22 extend upwardly from the top surface of the base 12. Each mounting block 22 provides the connection between the roller 14 and the base 12.

What is particularly useful about the elegantly simple design of the support device 10 is that it can be used in a variety of circumstances and on virtually any stable surface, no matter whether that surface is level or not. Once the threaded studs 16 at each corner are turned down or up to level out the base 12, the locking knobs 20 are tightened down and the roller support device 10 is ready for Use. As will be discussed further in connection with FIG. 4, the roller support device 10 can also be easily adapted to a permanent or semi-permanent installation, If we now turn to FIG. 2, we can examine the device of the present Invention in more detail.

Figure 2:
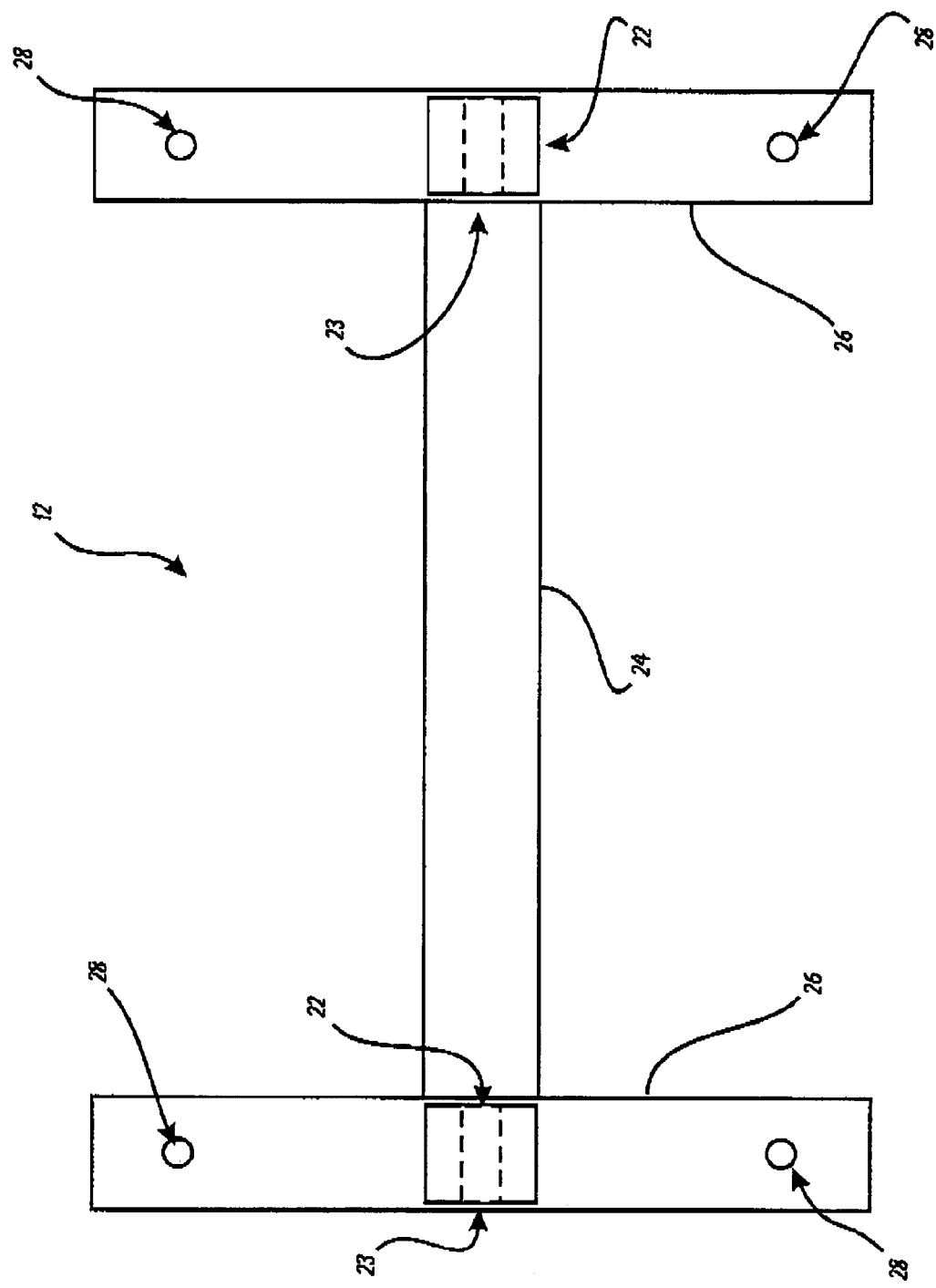
FIG. 2 is a top view of the base assembly of the device of FIG. 1.

FIG. 2 is a top view of the base 12 assembly of the device of FIG. 1. In this embodiment, the base 12 has a generally rectangular center member 24 and a side member 26 at each end thereof. The center member 24 and side members 26 are all preferably made from steel or other hard, durable material. As can be seen, the members 24 and 26 form an "H" shape, with threaded bores 28 formed through each distal end of the side members 26. The threaded bores 28 are formed to cooperate with the threaded studs (see FIG. 1) so that the threaded studs threaded engage the threaded bores 28.

Figure 3:
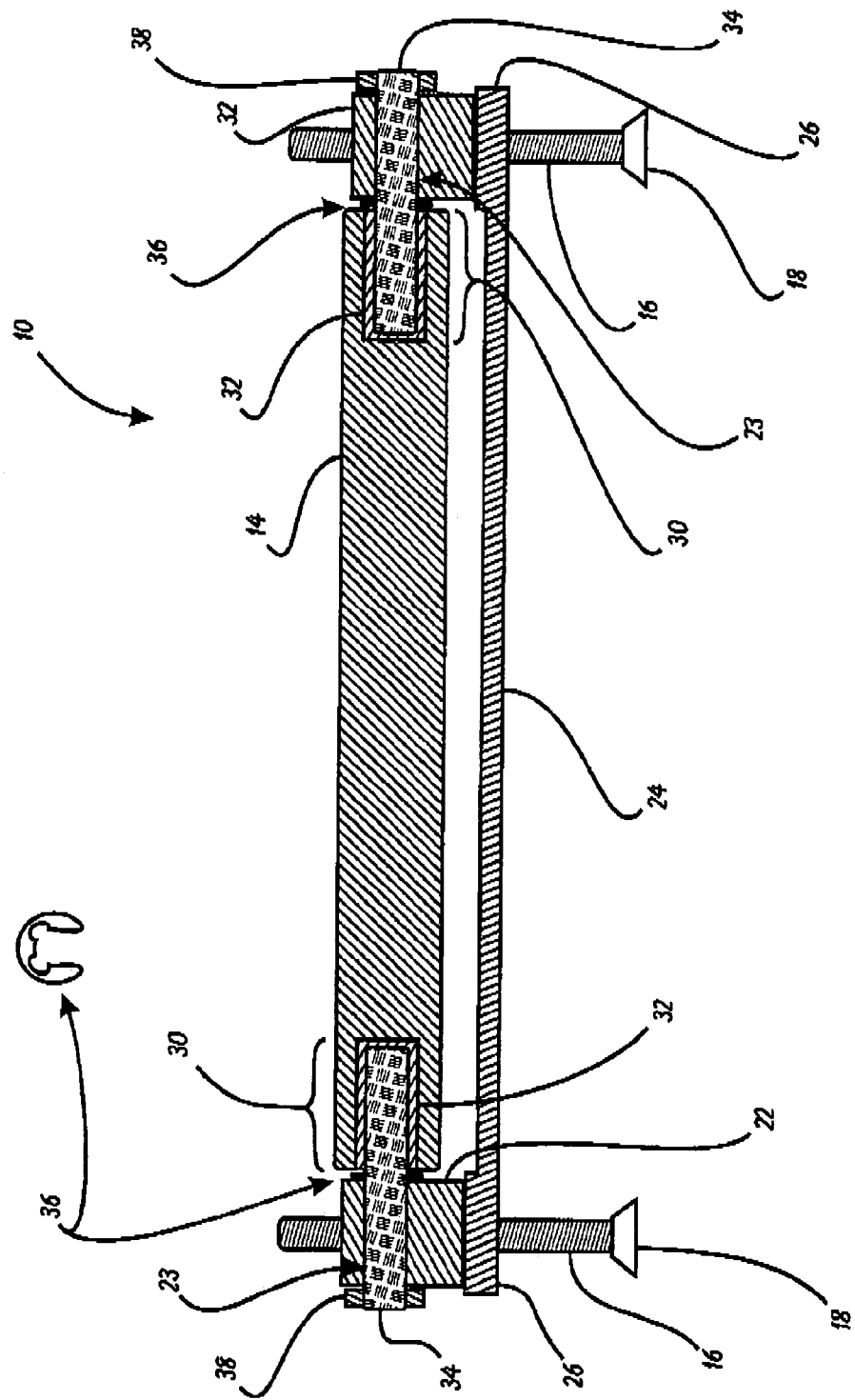
FIG. 3 is a cutaway side view of the device of FIGS. 1 and 2.

The mounting blocks 22 are attached or otherwise dispersed on the center portions of the side members 26. Each mounting block 22 has a non-threaded bore 23 formed therethrough; the two bores 23 being coaxial in spaced relation so that the roller (see FIG. 1) can be mounted on a shaft passing through each bore 23. FIG. 3 provides substantial additional detail regarding the present invention.

FIG. 3 is a cutaway side view of the device 10 of FIGS. 1 and 2. The roller 14 is preferably formed from a solid piece of aluminum, and has a cylindrical shape. Each end of the roller 14 has a socket 30 cut into it. A bearing sleeve 32 is pressed into each socket 30. The bearing sleeve 32 is made from a material that will allow the roller 14 to roll smoothly round the two shafts 34 attaching the roller 14 to the base 12. One ideal material that has proven to be suitable for this purpose is bronze due to its wear-resistant properties (i.e. as compared to aluminum).

As can be seen in this view, the side members 26 are preferably made from slightly thicker material than is the center member 24. The thicker material of the side members 26 provides an extremely stable base through which the threaded studs can engage, and can support very heavy loads. In contrast, the center section 24 simply interconnects the two side members 26.

The shafts 34 are retained within the sockets 30 formed within the roller 14 (and the bearing sleeves 32 therein) by retainer clips 36 pressed over/around the shaft 34 between the outer face of the roller 14 and the inner face of the mounting blocks 22. One suitable design for these retainer clips 36 are known as "E" clips that not only retain the shafts 34, but also create spring force between the face of the roller 14 and the face of the mounting block 22. Furthermore, a slip nut 38, such as a "nylock" nut is slipped over each outer (distal) end of the shafts 34 to keep the shafts 34 inserted within the sockets 30.

It should be clear from this view that the threaded studs 16 can be raised and lowered independent from one another to account for irregularities in the surface upon which the support device 10 is rested. Furthermore, the device 10 presents a very compact profile to make it supremely useful in a wide variety of applications, in the field, but also in the shop as depicted below in FIG. 4.

Figure 4:
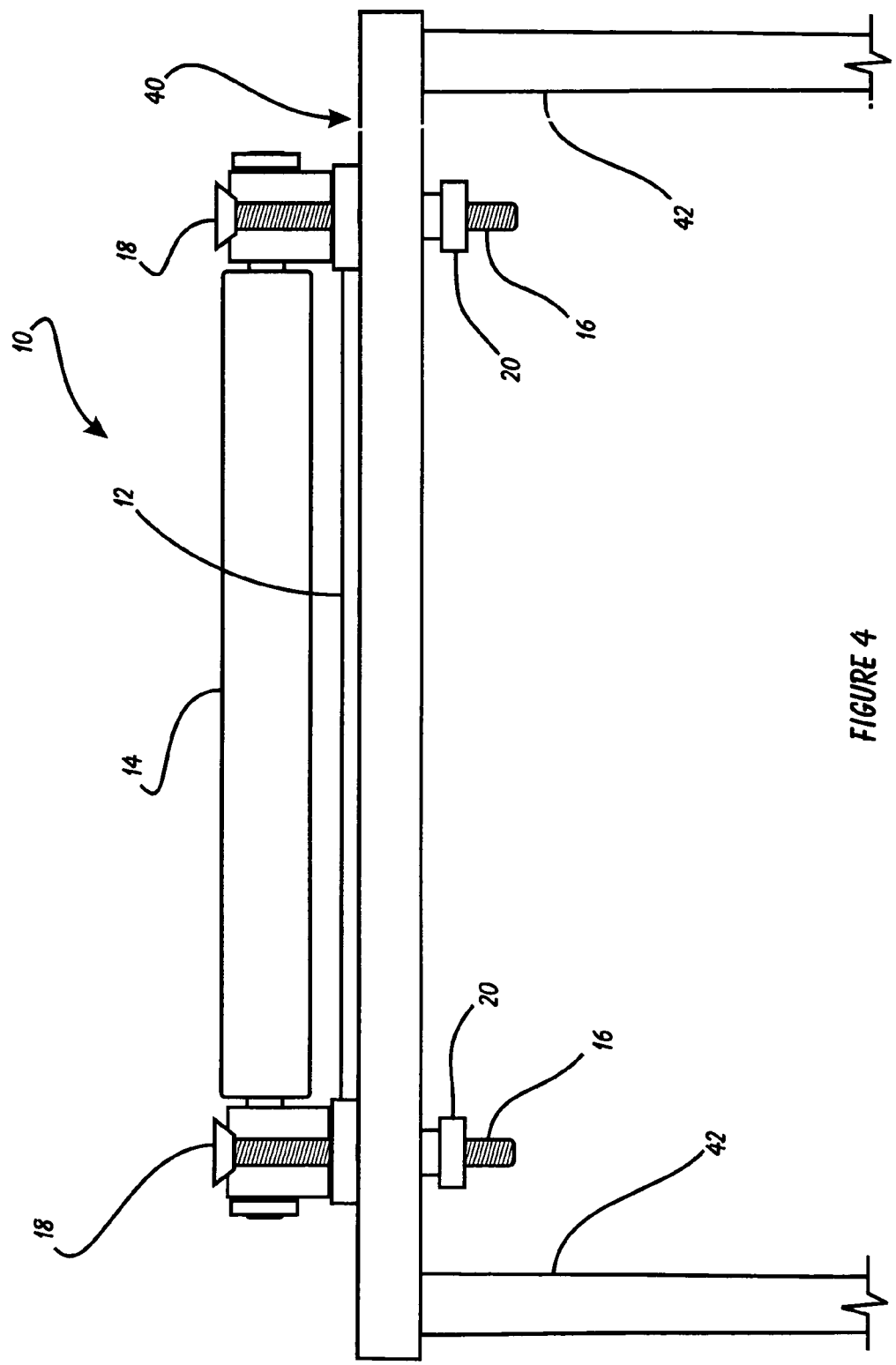
FIG. 4 is another side view of the device of FIGS. 1-3.

FIG. 4 is another side view of the device 10 of FIGS. 1-3. In this depiction, the device 10 has been converted and then mounted to a conventional workbench 40. For situations where a rolling support is desired where there is already a workbench installed, or where the height of the legs 42 of the bench is at a desirable level, attachment of the device thereto is a simple process.

First, two to four holes (large enough to accept the threaded studs therethrough) are cut through the top of the workbench 40 (or whatever other surface the user wishes to mount the device to). Each hole must align with a corresponding threaded stud 16, however, not all studs 16 need to have a hole, if not desired or necessary.

The threaded studs 16 are then removed from their respective threaded bores formed in the base 12 and flipped over (top to bottom). The threaded studs 16 are then rethreaded (with the feet 18 up) through the threaded bores until the feet 18 are low enough to be an obstruction and there is enough stud 16 exposed under the base 12, such that it will extend beyond the thickness of the workbench 40 top when the studs 16 are inserted into the corresponding holes formed in the top of the workbench 40.

Finally, the locking knobs 20 are threaded onto the (now bottom) ends of the threaded studs 16 until they are all tight to the bottom surface of the workbench 40 top. The portable roller support device 10 is now "permanently" installed (at least until the locking knobs 20 are removed). As should be clear, the device could even be mounted on surfaces that are not horizontal, however, unless an additional washer or locking knob 20 is added, there will not be any leveling adjustment availability for these types of installations (i.e. when the studs 16 are turned upside down).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A portable roller support device, comprising:
   an elongate roller defined by a circular cross-section and opposing ends, each said opposing end defined by a socket formed therein;
   a base defined by at least two threaded bores formed therethrough, a downwardly-extendable, height-adjustable leg extending through each said threaded bore;
   a pair of mounting members extending upwardly from said base in spaced relation and further defined by bores formed therethrough; and
   a pair of shafts, each said shaft extending through one said bore and into one said socket.

2. The device of claim 1, further comprising bearing sleeves inserted into said sockets, said bearing sleeves configured to accept a said shaft therein.

3. The device of claim 2, wherein each said downwardly-extendable, height-adjustable leg comprises a threaded stud threaded engaging each said threaded bore.

4. The device of claim 3, further comprising a foot extending from a first end of each said threaded stud.

5. The device of claim 4, further comprising a locking knob threadedly engaging each said threaded stud.

6. The device of claim 5, further comprising a slip nut inserted over an end of each said shaft protruding from said bore in said mounting member.

7. The device of claim 6, further comprising a retaining clip attached to each said shaft between said roller end and said adjacent mounting member.

8. The device of claim 7, wherein said roller is devoid of cavities except for said sockets.

9. A roller assembly, comprising:
   a base defining a top side and a bottom side, comprising a center member terminating in a pair of side members at each end thereof, each said side member defined by a pair of threaded bores formed therethrough and a mounting member extending upwardly from said top side, whereby said mounting members are in spaced relation;
   a roller positioned between said mounting members;
   a first shaft extending through one said mounting member and said roller;
   a second shaft extending through said other mounting member and into said roller; and
   four threaded suds, each said threaded studs threadedly engaging one said threaded bore to extend downwardly from said bottom side of said base.

10. The assembly of claim 9, further comprising a foot extending from a first end of each said threaded stud.

11. The assembly of claim 10, further comprising a locking knob threadedly engaging each said threaded stud.

12. The assembly of claim 11, wherein said roller is defined by a circular cross-section and a pair of opposing faces, each said face defined by a socket formed therein.

13. The assembly of claim 12, wherein said sockets are designed cooperatively with said shafts to accept said shafts therein.

14. The assembly of claim 13, further comprising bearing sleeves inserted into said sockets, said bearing sleeves configured to accept a said shaft therein.

15. The assembly of claim 14, wherein said roller is made from solid aluminum and said bearing sleeves are made from bronze.

16. A convertible roller support, comprising:

a base comprising a center member terminating in a pair of side members at each end thereof, each said side member defined by a pair of threaded bores formed therethrough and a mounting member extending upwardly therefrom, whereby said mounting members are in spaced relation, said base defining a top surface, a bottom surface and an H-shaped perimeter;

a roller positioned between said mounting members, said roller defined by a generally circular cross-section;

a first shaft extending through one said mounting member and into a socket formed in one end of said roller;

a second shaft extending through said other mounting member and into a socket formed in a second said end of said roller; and four threaded studs, each said threaded studs threadedly engaging one said threaded bore.

17. The support of claim 16, further comprising a foot extending from a first end of each said threaded stud.

18. The support of claim 17, further comprising a locking knob threadedly engaging each said threaded stud.

19. The support of claim 18, wherein said height from the top surface of said roller to a bottom surface of said base is less than six inches.

\* \* \* \* \*